United States Patent [19] [11] 4,071,478
Shen et al. [45] Jan. 31, 1978

[54] CONTROLLED PARTIALLY CROSS-LINKED 3,3-IONENES

[75] Inventors: Tsung-Ying Shen, Westfield; Arthur F. Wagner, Princeton, both of N.J.

[73] Assignee: Merck & Co., Inc., Rahway, N.J.

[21] Appl. No.: 693,589

[22] Filed: June 7, 1976

[51] Int. Cl.$^2$ ............................................. C08G 73/02
[52] U.S. Cl. .............................. 260/2 R; 260/2 EN; 260/37 N; 260/567.6 P; 424/78
[58] Field of Search .............. 260/2 R, 2 EN, 567.6 P

[56] References Cited

U.S. PATENT DOCUMENTS

| 2,884,057 | 4/1959 | Wilson et al. | 162/164 |
| 3,778,476 | 12/1973 | Rembaum et al. | 260/567.6 P |
| 3,784,649 | 1/1974 | Buckman et al. | 260/874 |

FOREIGN PATENT DOCUMENTS

| 1,064,160 | 4/1967 | United Kingdom | 260/567.6 P |

*Primary Examiner*—Harold D. Anderson
*Assistant Examiner*—E. A. Nielsen

*Attorney, Agent, or Firm*—Rudolph J. Anderson, Jr.; J. Jerome Behan; Henry H. Bassford, Jr.

[57] ABSTRACT

The invention disclosed herein relates to novel partially cross-linked, fully quaternized poly-[(methylimino)-trimethylene] polymers wherein a minor proportion (1% to 20%) of the nitrogen atoms in adjacent poly-[(methylimino)trimethylene] linear chains are, by quaternization, joined through trimethylene or 2-hydroxy-trimethylene bridges, the non-cross-linked nitrogens in the said linear chains being fully quaternized with lower alkyl or trialkylammoniopropyl groupings; and to the novel process for preparing these partially cross-linked, fully quaternized polymers which comprises reacting poly-[(methylimino)trimethylene] with 0.01 to 0.2 equivalents of 1,3-dihalo-propane or 1,3-dihalo-2-hydroxypropane per equivalent of tertiary amine in said poly-[(methylimino)trimethylene], and subsequently reacting the resulting product with excess alkyl halide or 3-halopropyltrialkylammonium halide. These partially cross-linked fully quaternized poly-[(methylimino) trimethylene] polymers are useful as highly-efficient bile acid sequestrants.

15 Claims, No Drawings

CONTROLLED PARTIALLY CROSS-LINKED 3,3-IONENES

DISCLOSURE OF THE INVENTION

This invention is concerned generally with novel partially cross-linked polymers consisting of linear chains of quaternary nitrogen atoms (a) which are linked to each other through trimethylene groupings to form the said linear chain and (b) some of which are also linked, by a controlled number of trimethylene bridges, to quaternary nitrogens of other linear chains, which may be schematically depicted, in the case of polymers containing 20%-equivalent cross-linking, by the following partial structural formula:

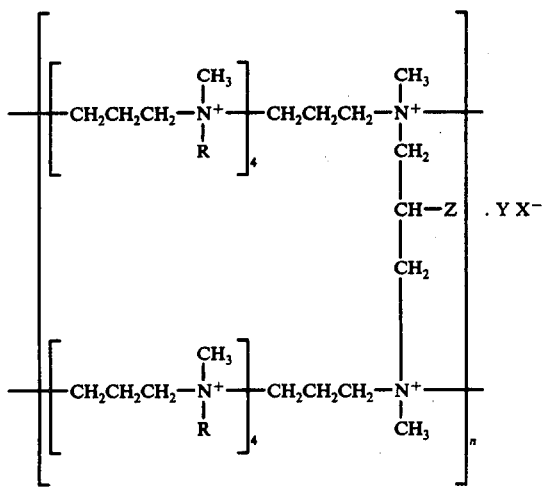

wherein Z is hydroxy or hydrogen; $n$ is a number greater than 2; $X^-$ is a halide ion; R is lower alkyl or trialkylammoniopropyl; and Y is $10n$ where R is lower alkyl and $18n$ where R is trialkylammoniopropyl. This formula, of course, represents only one of many possible structures, since the linear chains are necessarily cross-linked in a random manner.

The invention also relates to the novel process for the preparation of controlled partially cross-linked, fully quaternized poly-[(methylimino)trimethylene] polymers which comprises reacting poly[(methylimino)trimethylene] with 1% to 20% of the stoichiometric equivalent (based on the tertiary amine content of the polymer) of 1,3-dihalopropane or 1,3-dihalo-2-hydroxypropane, whereby substantially all of the dihalopropane compound reacts with a portion of the tertiary amine functions of the poly-[(methylimino)trimethylene] to form the corresponding 3-halopropyl quaternary halide functions; and continuing the reaction whereby the said 3-halopropyl moieties undergo further quaternization reactions with unreacted tertiary amine functions present in partially quaternized, or unreacted, poly-[(methylimino)trimethylene] thereby cross-linking linear polymers by trimethylene or 2-hydroxytrimethylene bridges; and then reacting this partially cross-linked, partially quaternized polymeric mixture with an excess of alkyl halide, or trialkylammoniopropyl halide, thereby fully quaternizing any residual tertiary amine groupings present in the said polymeric mixture and, if desired, reacting the resulting product with trimethylamine to convert any residual halopropropyl moieties, if present, to the corresponding quaternary trimethylammoniopropyl groupings.

The cross-linking quaternization reaction is conveniently conducted by bringing together the poly-[(methylimino)trimethylene] and a 1,3-dihalotrimethylene-cross-linking agent as for example, a 1,3-dihalopropane such as 1,3-dichloropropane, 1,3-dibromopropane, 1,3-diiodopropane, a 1,3-dihalo-2-hydroxypropane such as 1,3-dichloro-2-hydroxypropane, 1,3-dibromo-2-hydroxypropane, 1,3-diiodo-2-hydroxypropane, and the like, in a polar organic solvent such as dimethylformamide, a lower alkanol such as methanol, a lower dialkyl ketone such as acetone, mixtures of dimethylformamide with a lower alkanol such as methanol, mixtures of dimethylformamide with a lower dialkyl ketone such as acetone, mixtures of water with a polar organic solvent such as dimethylformamide, methanol, and the like. Where mixtures of water and polar organic solvents are employed, a proportion of polar organic solvent is ordinarily employed sufficient to insure at least partial dissolution of the dihalotrimethylene-cross-linking agent; the water content of such mixtures is ordinarily adjusted so as to insure complete solution of the reaction polymer and its cross-linked derivative whereby the cross-linking reaction proceeds to completion in solution, and is not inhibited by premature precipitation of partially quaternized intermediate. Whereas dimethylformamide, mixtures of dimethylformamide and methanol, and mixtures of dimethylformamide and water are preferred solvents for the cross-linking reaction, it may in some circumstances be convenient to employ methanol, or mixtures of methanol and water in this reaction. The trimethylene-cross-linking quaternization reaction proceeds slowly at room temperature, but it is ordinarily preferred to conduct the reaction at a temperature up to about 75° C.; at the latter temperature, the trimethylene-cross-linking quaternization reaction ordinarily requires about 12 hours, although it is preferred to allow the reaction to proceed for an additional period of time from about 18 hours to 3 days to substantially complete the trimethylene-cross-linking quaternization reaction.

The linear poly-[(methylimino)trimethylene] employed as starting material in this trimethylene-cross-linking quaternization reaction ordinarily possesses a molecular weight within the range of about 1,000 to 20,000, preferably about 1400. This linear poly-[(methylimino)trimethylene] is conveniently prepared as follows: A mixture of 94 grams (1.13 moles) of t-butyl isonitrile, 85 grams (1.13 moles) of freshly distilled 3-aminopropanol, and 7.4 grams (0.055 mole) of silver cyanide is stirred at a temperature of 90° C. under a nitrogen atmosphere for a period of 16 hours. The reaction mixture is distilled in vacuo (45 mm pressure), and the distillate is then fractionally distilled in vacuo; the material, which distills at 58° C. at 58 mm pressure, is substantially pure 5,6-dihydro-4H-1,3-oxazine; $n_D^{25}$ 1.4485. A solution of 44 grams (0.52 mole) of this 5,6-dihydro-4H-1,3-oxazine in 140 ml. of purified dimethylformamide is placed in a pressure tube, 1.52 grams (0.011 mole) of iodomethane is added, and the system is purged with nitrogen. The tube is then sealed, and the tube and contents are heated at a temperature of 80° C. for a period of 5 hours. The reaction mixture is cooled, diluted with 10 volumes of ether, and the insoluble reaction product is recovered by filtration, washed with ether, and dried under reduced pressure at a temperature of 75° C. to give poly-[(formimino)trimethylene]; m.p. 111° C.-112° C. dec. A mixture of 53 grams of the poly-[(formimino)trimethylene], 1320 grams of 97%–100% formic acid, and 308 grams of 38% aqueous formaldehyde solution is heated at a temperature of 100° C. for a period of 120 hours. The reaction solution is cooled, 650 ml. of concentrated aqueous hydrochloric acid is added, and the aqueous acidic mixture is evaporated to dryness in vacuo at a temperature of 50° C. The residual material is triturated with 400 ml. of methanol, and the insoluble product is recovered by filtration, washed with ether, and dried under reduced pressure to give poly-[(methylimino)trimethylene hydrochloride]. A solution of 67 grams (630 milliequiv.) of this poly-[(methylimino)trimethylene hydrochloride] in 600 ml. of water is treated with 39 grams (0.72 mole) of sodium methoxide. The solution is subjected to ultrafiltration thereby removing the sodium chloride, and the residual solution of the polymer free base is evaporated in vacuo at a temperature of 50° C. to give approximately 60 grams of poly-[(methylimino)trimethylene].

The 1,3-dihalotrimethylene-cross-linking agents employed in this trimethylene-cross-linking reaction include 1,3-dihalopropanes such as 1,3-dichloropropane, 1,3-dibromopropane, 1,3-dihalo-2-hydroxypropanes such as 1,3-dibromo-2-hydroxypropane, 1,3-dichloro-2-hydroxypropane, 1,3-diiodo-2-hydroxypropane, and the like; it is ordinarily preferred to employ 1,3-dibromopropane as the agent for effecting trimethylene cross-linking, and 1,3-dichloro-2-hydroxypropane or 1,3-dibromo-2-hydroxypropane for the 2-hydroxy-trimethylene-cross-linking. The proportions of 1,3-dihalotrimethylene-cross-linking agent employed can vary from approximately 1% to 20% of the stoichiometric equivalent of the tertiary amine functions present in the poly-[(methylimino)trimethylene]. Thus, when a poly-[(methylimino)trimethylene] having a molecular weight of about 1400 (which corresponds to approximately twenty methyliminotrimethylene units in the polymer) the employment of 20% of the stoichiometric equivalent of 1,3-dihalo-trimethylene-cross-linking agent would result in an average of approximately four cross-linkages per linear polymer chain; the employment of 5% of the stoichiometric equivalent of 1,3-dihalo-trimethylene cross-linking agent would give a cross-linked polymer having an average of one cross-linkage per linear polymer chain. When poly-[(methylimino)trimethylene] having a high molecular weight of about 20,000 is employed, however, the employment of 1% of the stoichiometric equivalent of 1,3-dihalo-trimethylene-cross-linking agent would result in a cross-linked polymer having an average of about three cross-linkages per polymer chain.

The complete quaternization of the 1,3-trimethylene (or 2-hydroxy-1,3-trimethylene) partially cross-linked poly-[(methylimino)trimethylene], wherein the cross-linking is approximately 1 to 20% of the stoichiometric equivalent of the tertiary amine functions, is carried out by reacting the 1,3-trimethylene (or 2-hydroxy-1,3-trimethylene) cross-linked polymer with a substantial excess (e.g. a 2 to 10-fold excess) of an alkyl halide, preferably a methyl halide such as methyl chloride, methyl bromide, methyl iodide, a 3-halopropyltrialkylammonium halide such as 3-bromopropyltrimethylammonium bromide, and the like, whereby the residual tertiary amine functions (which have not been quaternized by reaction with the 1,3-dihalotrimethylene-cross-linking agent) are now quaternized by reaction with the methyl halide or 3-halopropyltrialkylammonium halide. This final quaternization is ordinarily conducted in a polar solvent such as water, a polar organic solvent as for example dimethylformamide, a lower alkanol such as methanol, a lower dialkyl ketone such as acetone, or mixtures thereof, such as dimethylformamide-methanol, aqueous dimethylformamide, aqueous methanol, and the like. Whereas the reaction is conveniently carried out in dimethylformamide, the use of an aqueous reaction solution insures complete solution of, and avoids premature precipitation, of an incompletely quaternized polymer product, whereby complete quaternization of the polymer is achieved. A solution of methyl chloride or methyl bromide in dimethylformamide or methanol is conveniently prepared by cooling the solvent to about 5° C., and then adding the methyl bromide or methyl chloride. It is not necessary to cool the solvent before adding the methyl iodide or 3-bromopropyltrimethylammonium bromide. The methanolic or dimethylformamide solution of methyl chloride, methyl bromide, methyl iodide or 3-bromopropyltrimethylammonium bromide is then added at about room temperature to a solution of the trimethylene-cross-linked (or 2-hydroxy-trimethylene-cross-linked) poly-[(methylimino)trimethylene]. The quaternization reaction between the methyl chloride, methyl bromide, methyl iodide or 3-bromopropyltrimethylammonium bromide, and the residual tertiary amine functions present in the polymer occurs at room temperature, but the reaction mixture is ordinarily heated in a closed vessel at a temperature of about 50° C. to 75° C. for a period of about 12 to 24 hours, thereby insuring completion of the quaternization reaction. The reaction mixture is evaporated to dryness in vacuo, and the residual material is washed with ether and dried under reduced pressure to give, where a methyl halide is utilized for this quaternization reaction, substantially completely quaternized, 1,3-trimethylene-cross-linked (or 2-hydroxy-1,3-trimethylene-cross-linked) poly-[(dimethyliminio)trimethylene halide], or, where a 3-halopropyltrimethylammonium halide is used for the quaternization, substantially completely quaternized 1,3-trimethylene-cross-linked (or 2-hydroxy-1,3-trimethylene-cross-linked) poly-[{methyl-(3-trimethylammoniopropyl)iminio}trimethylene dihalide], the said cross-linked polymer containing between about 1% to 20% cross-linking. The nuclear magnetic resonance spectra of the polymeric products prepared in accordance with this procedure show the presence of quaternized amine moieties, and the substantial absence of tertiary amine functions, thus demonstrating substantially complete quaternization.

These novel partially cross-linked fully quaternized poly-[(methylimino)trimethylene] polymers wherein a minor proportion (1% to 20%) of the nitrogen atoms in adjacent poly-[(methylimino)trimethylene] linear chains are, by quaternization, joined through trimethylene or 2-hydroxy-trimethylene bridges, and wherein the non-cross-linked nitrogens in the said linear chains are fully quaternized by reaction with an alkyl halide or a 3-halopropyltrialkylammonium halide, include 1,3-trimethylene-cross-linked poly-[(alkyl-methyliminio)-trimethylene halides] such as 1,3-trimethylene-cross-linked poly-[(dimethyliminio)trimethylene bromide], 2-hydroxy-1,3-trimethylene-cross-linked poly-[(alkyl-methyliminio)trimethylene halides] such as 2-hydroxy-1,3-trimethylene-cross-linked poly-[(dimethyliminio)-trimethylene chloride]; 1,3-trimethylene-cross-linked poly-[{methyl-(3-trialkylammoniopropyl)iminio}•trimethylene dihalides] such as 1,3-trimethylene-crosslinked poly-[{methyl-(3-trimethylammoniopropyl-)iminio}trimethylene dibromide]; 2-hydroxy-1,3-trimethylene-cross-linked poly-[{methyl-(3-trialkylammoniopropyl)iminio}trimethylene dihalides], such as 2-hydroxy-1,3-trimethylene-cross-linked poly-[{methyl-(3-trimethylammoniopropyl)iminio}trimethylene dichloride], and the like, as well as other polymeric quaternary ammonium salts wherein the halide counteranion of the hereinabove described 1,3-trimethylene (or 2-hydroxy-1,3-trimethylene)-cross-linked poly-[(alkylmethyliminio)trimethylene halide] or 1,3-trimethylene (or 2-hydrox-1,3-trimethylene)-cross-linked poly-[{methyl-(3-trialkylammoniopropyl)iminio}trimethylene dihalide] are replaced by other pharmacologically-acceptable counteranions such as sulae, hydrogensulfate, hydrogenphosphate, dihydrogenphosphate, acetate, pivalate, succinate, maleate, fumarate, lactate, tartrate, citrate, benzoate, nicotinate, pamoate, benzenesulfonate, ethanesulfonate, 1,2-ethanedisulfonate, alginate, polyacrylate, and the like. These quaternary 1,3-trimethylene-partially (1 – 20%) cross-linked poly-[(dimethyliminio)trimethylene halides (or other pharmacologically acceptable anions)] or poly-[{methyl-(3-trimethylammoniopropyl)iminio}trimethylene dihalides (or other pharmcologically acceptable anions)], and their 2-hydroxy-1,3-trimethylene-partially-cross-linked analogs, are extremely active bile acid sequestrants being effective in remarkably small dosages following oral administration. Moreover, while our preferred quaternary 1,3-trimethylene-partially (1 – 20% cross linked oly-[(dimethyliminio)trimethylene halides (or other pharmacologically acceptable anions)] or poly-[{methyl-(3-trimethylammoniopropyl)iminio}•trimethylene dihalides (or other pharmacologically acceptable anions(], and their 2-hydroxy-1,3-trimethylene-partially-cross-linked analogs, are substantially equal in bile acid binding capacity to the corresponding linear unbranched, non-cross-linked quaternary polymers, the new partiall cross-linked polymers possess physical properties which facilitate their incorporation in pharmaceutical compositions and formulations as compared with the corresponding non-cross-linked analogs. Thus, effective binding of bile acids is obtained by oral administration of remarkably small dosages of the partially cross-linked polymers of this invention; and their physical properties provide for flexibility in preparation of pharmaceutical formulations.

The new partially cross-linked polymers can be finely divided powders and suitably used as such or preferably admixed with varying amounts of solid carrier agents such as colloid silica, starches, sucrose, talc, lactose, cellulose, or modified cellulose, dry milk powder, protein powders such as soy flour, and the like. These are preferably made into unit dosage forms such as tablets, filled gelatin capsules or a foil or paper envelope containing the premeasured dose which can include supplementary vitamins and minerals, and which can be readily torn open and added to edible liquids such as fruit juices or other beverages. The unit dose composition may comprise from 10% to 99% by weight of polymer, the remainder being carriers, flavorings, excipients, flow agents and the like. In such a unit dose, the active partially cross-linked polymer may comprise from 0.1 gm. to up to 10 gms. in powder packets. The new partially cross-linked polymers may also be encapsulated. The total daily dosage of bile acid binding partially cross-linked polymer is preferably divided into three or four equal portions and taken before each meal and prior to bedtime. This regimen provides for maximum polymer contact time during periods of highest intestinal bile acid concentrations.

The following examples illustrate methods of carring out the present invention, but it is to be understood that these examples are given for purposes of illustration and not of limitation.

EXAMPLE 1

About 500 mg. of poly-[(methyliminio)trimethylene] having a molecular weight of about 1400 (which corresponds to approximately seven milliequivalents of tertiary amine) is dissolved in 10 ml of dimthylformamide, and to this solution is added approximately 140 mg (0.7 millimole) of 1,3-dibromoprpane (which corresponds to approximately 20% of the stoichiometric equivalent of tertiary amine in the polymer). The resulting mixture is heated at a temperature of about 75° C. for a period of about 3 days, and the reaction mixture is evaporated to dryness in vacuo to give about 650 mg of a glassy product consisting of partially quaternized, approximately 20% 1,3-trimethylene-cross-linked, poly-[(methylimino)trimethylene]. The nuclear magnetic resonance spectrum of this pocket shows the presence of quaternary ammonium and tertiary amine functions in a ratio of about one to four.

This partially quaternized, approximately 20% 1,3-trimethylene-cross-linked, poly-[(methylimino)trimethylene] is added, at room temperature, to a solution of about 3.3 grams (approximately five-fold excess) of methyl bromide in 10 ml of dimethylformamide; a quaternization reaction occurs at room temperature. The resulting mixture is heated in a closed vessel at about 50° C. for a period of about 24 hours, thereby ensuring completion of the quaternization reaction. The amorphous product which separates is recovered by centrifugation, and the residual material is washed with ether, and dried in vacuo to give substantially completely quaternized,1,3-trimethylene-cross-linked,poly-[(dimethyliminio)trimethylene bromide] containing approximately 20% cross-linking. The nuclear magnetic resonance spectrum of this product shows the presence of quaternized amine moieties, and the absence of tertiary amine functions, thus demonstrating substantially complete quaternization.

EXAMPLE 2

About 1.06 grams of poly-[(methylimino)trimethylene] having a molecular weight of about 1400 (which corresponds to approximately 14.9 milliequivalents of tertiary amine) is dissolved in 10 ml of dimethylformamide, and to this solution is added a solution of approximately 100 mg of 1,3-dichloro-2-hydroxypropane in 1 ml of dimethylformamide (i.e. 0.77 millimole of 1,3-dichloro-2-hydroxy-propane, or slightly over 10% of the stoichiometric equivalent of the teritary amine in the polymer). The resulting mixture is heated at a temperature of about 75° C. for a period of approximately 18 hours, and the reaction mixture is evaporated to dryness in vacuo. The residual material is placed in an ultrafilter cell, and ultrafiltered thereby removing unreacted cross-linking reagent. After about 1300 ml of ultrafiltrate is collected, the retentate is evaporated to dryness in vacuo to give a product consisting of partially quaternized, approximately 7% 2-hydroxy-1,3-trimethylene-cross-linked, poly-[(methylimino)-trimethylene]; chloride ion; Found 3.33%.

This partially quaternized, approximately 7% 2-hydroxy-1,3-trimethylene-cross-linked, poly[(methylimino)trimethylene] (about 1 gram) is dissolved in 5 ml of methanol, and to this solution is added, at room temperature, a solution of about 8 grams (approximately 4-fold excess) of methyl iodide in 5 ml of methanol; a quaternization reaction occurs rapidly at room temperature. After several hours, the solvent is removed by decantation and the product is washed with methanol. The product is dissolved in 20 ml. of water, and the solution is percolated slowly through a 50-ml column of quaternary ammonium anion-exchange resin on the chloride ion cycle (40 milliequivalents $Cl^-$). The eluate containing the chloride counteranion form of the product is evaporated to dryness in vacuo, and the residual material is washed with ether and dried under reduced pressure to give substantially completely quaternized 2-hydroxy-1,3-trimethylene-cross-linked poly-[(dimethyliminio)trimethylene chloride], containing approximately 7% cross-linking. The nuclear magnetic resonance spectrum of this product shows the presence of quaternized amine moieties, and the substantial absence of tertiary amine functions, thus demonstrating substantially complete quaternization.

Various changes and modifications may be made in carrying out the present invention without departing from the spirit and scope thereof. Insofar as these changes and modifications are within the purview of the annexed claims, they are to be considered as part of this invention.

What is claimed is:

1. The process which comprises reacting a poly-[(methylimino)trimethylene] polymer with about 1% to 20% of the stoichiometric equivalent (based on the tertiary amine content of the polymer) of 1,3-dihalopropane or 2-hydroxy-1,3-dihalopropane, thereby forming a partially (1% to 20%) cross-linked, partially-quaternized polymeric mixture, wherein nitrogen atoms in adjacent poly-[(methylimino)trimethylene] linear chains are, by quaternization, joined through trimethylene or 2-hydroxy-trimthylene bridges; and reacting the said partially cross-linked, partially quaternized polymeric mixture with an excess of alkyl halide or trialkylammoniopropyl halide, thereby quaternizing any residual tertiary amine groupings present in the said polymeric mixture to form the corresponding substantially completely quaternized, 1% to 20% (1,3-trimethylene or 2-hydroxy-1,3-trimethylene)-cross-linked, poly-[(alkylmethyliminio)trimethylene halide] or poly-[{methyl-(3-trialkylammoniopropyl)iminio}trimethylene dihalide].

2. The process as defined in claim 1 wherein poly-[(methylimino)trimethylene] is reacted with 1% to 20% of the stoichiometric equivalent of 1,3-dihalopropane, and the resulting 1,3-trimethylene-partially quaternized, partially cross-linked, poly-[(methylimino)trimethylene] is reacted with excess alkyl halide to form the corresponding substantially completely quaternized, 1% to 20% 1,3-trimethylene-cross-linked, poly-[(alkylmethyliminio)trimethylene halide].

3. The process as defined in claim 1 wherein poly-[(methylimino)trimethylene] is reacted with approximately 20% of the stoichiometric equivalent of 1,3-dibromoprpane, and the resulting 20% quaternized, 20% 1,3-trimethylene-cross-linked, poly-[(methylimino(trimethylene] is reacted with excess methyl bromide to form substantially completely quaternized, 20% 1,3-trimethylene-cross-linked, poly-[(dimethyliminio)trimethylene bromide].

4. The process as defined in claim 1 wherein poly-[(methylimino)trimethylene] is reacted with about 1% to 20% of the stoichiometric equivalent of 2-hydroxy-1,3-dihalopropane, and the resulting partially quaternized, partially 2-hydroxy-1,3-trimethylene-cross-linked, poly-[(methylimino)trimethylene] is reacted with an excess of alkyl halide to form the corresponding substantially completely quaternized, 1% to 20% 2-hydroxy-1,3-trimethylene-cross-linked, poly-[(alkylmethyliminio)trimethylene halide].

5. The process as defined in claim 1 wherein poly-[(methylimino)trimethylene] is reacted with approximately 7% of the stoichiometric equivalent of 2-hydroxy-1,3-dichloropropane, and the resulting 7% quaternized, 7% 2-hydroxy-1,3-trimethylene-cross-linked, poly-[(methylimino)trimethylene] is reacted with excess methyl chloride to form the corresponding substantially completely quaternized, 7% 2-hydroxy-1,3-trimethylene-cross-linked, poly-[(dimethyliminio)trimethylene chloride].

6. The process as defined in claim 1 wherein poly-[(methylimino)trimethylene] is reacted with about 1% to 20% of the stoichiometric equivalent of 1,3-dihalopropane, and the resulting partially quaternized, partially 1,3-trimethylene-cross-linked, poly-[(methylimino)trimethylene] is reacted with excess trialkylammoniopropyl halide to form the corresponding substantially completely quaternized, 1% to 20% 1,3-trimethylene-cross-linked, poly-[{methyl-(3-trialkylammoniopropyl)iminio}trimethylene dihalide].

7. The process as defined in claim 1 wherein poly-[(methylimino)trimethylene] is reacted with approximately 20% of the stoichiometric equivalent of 1,3-dibromopropane, and the resulting 20% quaternized, 20% 1,3-trimethylene-cross-linked, poly-[(methylimino(trimethylene] is reacted with an excess of trimethylammoniopropyl bromide to form the substantially completely quaternized, 20% 1,3-trimethylene-cross-linked, poly-[{methyl-(3-trimethylammoniopropyl)iminio}trimethylene dibromide].

8. The process as defined in claim 1 wherein poly-[(methylimino(trimethylene] is reacted with about 1% to 20% of the stoichiometric equivalent of 2-hydroxy-1,3-dihalopropane, and the resulting partially quaternized, partially 2-hydroxy-1,3-trimethylene-cross-linked, poly-[(methylimino)trimethylene] is reacted with excess trialkylammoniopropyl halide to form the corresponding substantially completely quaternized, 1% to 20% 2-hydroxy-1,3-trimethylene-cross-linked, poly-[{methyl-(3-trialkylammoniopropyl)iminio}trimethylene dihalide].

9. The process as defined in cllaim 1 wherein poly-[(methylimino)trimethylene] is reacted with about 7% of the stoichiometric equivalent of 2-hydroxy-1,3-dichloropropane, and the resulting 7% quaternized, 7% 2-hydroxy-1,3-trimethylene-cross-linked, poly-[(methylimino)trimethylene] is reacted with an excess of trimethylammoniopropyl chloride to form substantially completely quaternized, 7% 2-hydroxy-1,3-trimethylene-cross-linked, poly-[{methyl-(3-trimethylammoniopropyl)iminio}trimethylene dichloride].

10. The substantially completely quaternized, 1% to 20% (1,3-trimethylene or 2-hydroxy-1,3-trimethylene)-cross-linked, poly-[{methyl-(alkyl or 3-trialkylammoniopropyl)iminio}trimethylene(halide, dihalide or other pharmacologically acceptable anion)], characterized as being active as bile acid sequestrant.

11. A partially cross-linked, quaternary polymer, having bile acid sequestrant activity, selected from the group consisting of completely quaternized, 1% to 20% 1,3-trimethylene-cross-linked, poly-[(alkylmmethyliminio)trimethylene halide]; completely quaternized, 1% to 20% 2-hydroxy-1,3-trimethylene-cross-linked, poly-[(alkyl-methyliminio)trimethylene halide]; commpletely quaternized, 1% to 20% 1,3-trimethylene-cross-linked, poly-[{methyl-(3-trialkylammoniopropyl)iminio}trimethylene dihalide]; and completely quaternized 1% to 20% 2-hydroxy-1,3-trimethylene-cross-linked, poly-[{methyl-(3-trialkylammoniopropyl)iminio}trimethylene dihalide}, and pharmacologically acceptable salts thereof in which the halide counteranions are replaced by other pharmacologically acceptable counteranions.

12. The substantially completely quaternized, 1% to 20% 1,3-trimethylene-cross-linked, poly[(dimethyliminio)trimethylene chloride].

13. The substantially completely quaternized, 1% to 20% 1,3-trimethylene-cross-linked, poly-[{methyl-(3-trimethylammoniopropyl)iminio}trimethylene dichloride].

14. The substantially completely quaternized, 1% to 20% 2-hydroxy-1,3-trimethylene-cross-linked, poly-[(dimethyliminio)trimethylene chloride].

15. The substantially completely quaternized, 1% to 20% 2-hydroxy-1,3-trimethylene-cross-linked, poly-[{methyl-(3-trimethylammoniopropyl)iminio}trimethylene dichloride].

* * * * *